(12) United States Patent (10) Patent No.: US 7,836,495 B2
Diaz-Cuellar et al. (45) Date of Patent: Nov. 16, 2010

(54) REMOTE CONFIGURATION OF SOFTWARE COMPONENT USING PROXY

(75) Inventors: Gerardo Diaz-Cuellar, Snoqualmie, WA (US); Eran Yariv, Redmond, WA (US); David Abzarian, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 11/495,412

(22) Filed: Jul. 28, 2006

(65) Prior Publication Data

US 2008/0028457 A1 Jan. 31, 2008

(51) Int. Cl.
*G06F 9/00* (2006.01)
(52) U.S. Cl. .............................. 726/12; 726/11; 726/13; 726/14
(58) Field of Classification Search ................. 713/201, 713/164; 726/11–14
See application file for complete search history.

(56) References Cited

U.S. PATENT DOCUMENTS

| | | | | |
|---|---|---|---|---|
| 5,822,539 | A | 10/1998 | Van Hoff | 395/200.66 |
| 5,826,014 | A | 10/1998 | Coley et al. | 395/187.01 |
| 5,915,087 | A | 6/1999 | Hammond et al. | 395/187.01 |
| 5,983,350 | A | 11/1999 | Minear et al. | 713/201 |
| 6,098,172 | A | 8/2000 | Coss et al. | 713/201 |
| 6,104,716 | A | 8/2000 | Crichton et al. | 370/401 |
| 6,643,778 | B1 | 11/2003 | Nakazawa | 713/201 |
| 6,684,329 | B1 | 1/2004 | Epstein et al. | 713/150 |
| 6,832,256 | B1 | 12/2004 | Toga | 709/229 |
| 6,868,144 | B2 | 3/2005 | Skladman et al. | 379/88.13 |
| 7,028,336 | B2 | 4/2006 | Wesinger, Jr. et al. | 726/11 |
| 2003/0079146 | A1* | 4/2003 | Burstein | 713/201 |
| 2004/0255156 | A1 | 12/2004 | Chan et al. | 713/201 |
| 2005/0149747 | A1* | 7/2005 | Wesinger et al. | 713/200 |
| 2006/0045068 | A1 | 3/2006 | Wu et al. | 370/352 |
| 2006/0122941 | A1 | 6/2006 | Coley et al. | 705/59 |
| 2006/0224749 | A1* | 10/2006 | Bansal et al. | 709/229 |
| 2007/0101421 | A1* | 5/2007 | Wesinger et al. | 726/11 |
| 2007/0124814 | A1* | 5/2007 | Logigan et al. | 726/12 |

OTHER PUBLICATIONS

CISCO PIX Firewall and VPN Cofiguration Guide version 6.3 Date: 2003.*
Steven, Anthony, "Applying the Principle of Leasts Privilege to User Accounts on Windows XP", http://www.microsoft.com/technet/prodtechnol/winxppro/maintain/luawinxp.mspx, 2006, 26 pages.

(Continued)

*Primary Examiner*—Thanhnga B Truong
(74) *Attorney, Agent, or Firm*—Woodcock Washburn LLP

(57) ABSTRACT

A proxy service receives requests from a remote caller to configure a main service. The proxy service authenticates the caller and validates the request. The proxy service then passes the request along to the main service if the caller can be authenticated and if the request can be validated. The proxy service runs at a non-privileged level, but when the proxy service passes the request to the main service, the proxy service impersonates the caller so that the request to the main service is made at the original caller's level of privilege. The main service can block all inbound network traffic, since network requests to configure the main service are received by the proxy, which is a local object from the perspective of the main service. Additionally, the proxy can block inbound traffic other than a certain class of requests (e.g., Remote Procedure Calls).

20 Claims, 4 Drawing Sheets

OTHER PUBLICATIONS

"Adaptive Proxy Firewalls: The Next Generation Firewall Architecture eliminating the Speed-vs-Security Compromise", http://cncenter.future.cokr/resource/rsc-center/vendor-wp/nai/gauntlet_adaptiveproxy.doc, 10 pages.

"Raptor Firewall Raptor PowerVPN VelociRaptor", Reference Guide, Nov. 2000, Version 6.5, http://www.sun.com/hardware/serverappliances/pdfs/discontinued/manual.velociraptor.pdf, i thru xx, 1-1 thru I-9.

* cited by examiner

REMOTE CONFIGURATION OF SOFTWARE COMPONENT USING PROXY

BACKGROUND

In computer systems it is often desirable to allow a component to be configured remotely through a network. One example of a component that can be configured is the firewall—e.g., the firewall can be set to allow or block network traffic, or can be turned on or off. It is convenient for an administrator to be able to set the parameters of the firewall remotely. However, a firewall is normally configurable only by a user with administrator or network operator privileges, and allowing a firewall (or the supporting service that allows configuration of the firewall) to accept network connections at a privileged level creates a security risk and increases the attack surface of the machine on which the firewall is running.

It is thus desirable to allow a component such as the firewall to be configured remotely, but without requiring the component to accept network requests that run at a high level of privilege.

SUMMARY

A system component, such as a firewall, can be set to accept local configuration requests without accepting network configuration requests. A proxy can then be provided that accepts configuration requests over the network from a caller and authenticates the caller. If the caller is determined to have the requisite level of privilege, then the proxy can issue the request while impersonating the caller. Since remote configuration requests are routed through the proxy, the component itself (e.g., the firewall) can be set to block inbound network connections, thereby reducing the component's attack surface. Since the proxy impersonates the remote call after verifying the caller's credentials, rather than allowing a remote caller to run on the local machine under administrator privileges, the possibility that the proxy would be used by a hacker to gain privileged access to the local machine is reduced.

The proxy can expose the same interface that the component to be configured exposes. Thus, the caller can issue a request to the proxy in the same manner as the request would be made if it were being made directly to the component itself. Additionally, the proxy can perform validation tests on the request before concluding that the request should be passed to the component.

Other features are described below.

DETAILED DESCRIPTION

Overview

Figure 1:
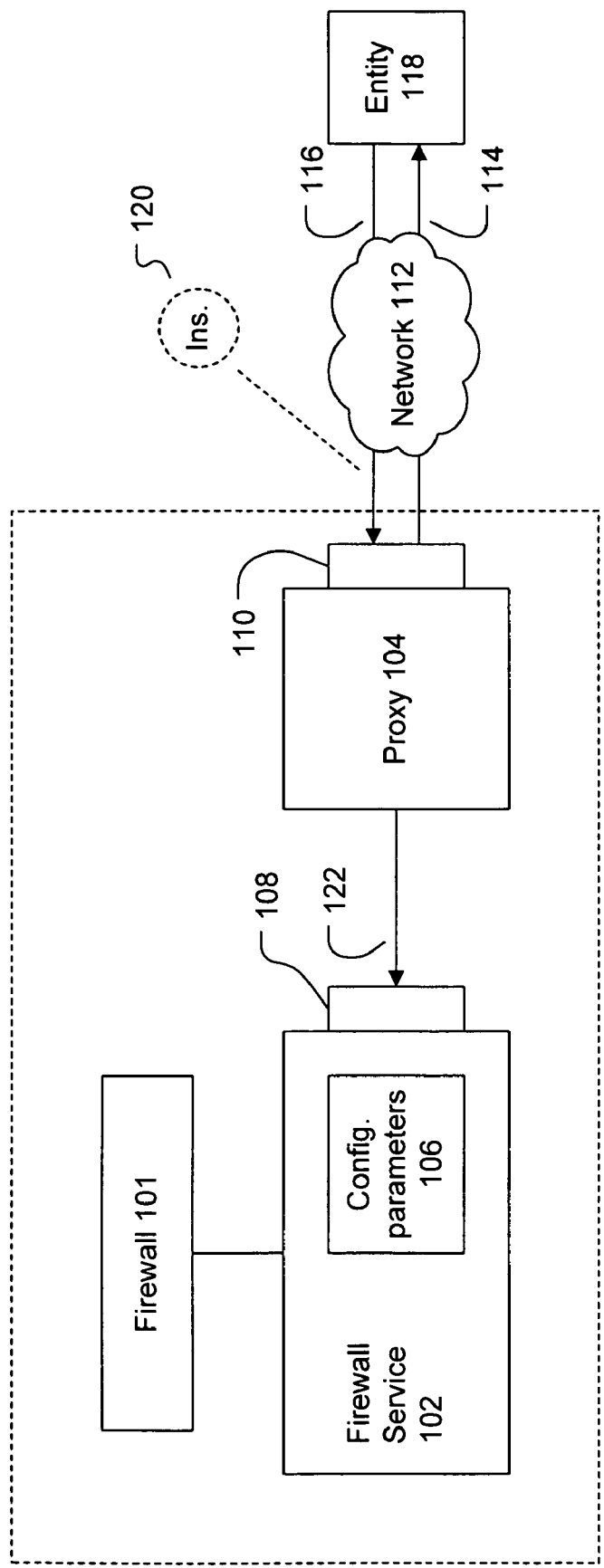
FIG. 1 is a block diagram of example components that may be used in accordance with the subject matter described herein.

One aspect of building a secure computer system is to minimize the attack surface of the system—i.e., to reduce the availability of opportunities for an attacker to work mischief on the system. One feature that can provide defense for a secure computer system is a firewall, which exerts some control over interaction between the computer system and the world outside of the computer system. A firewall is typically configurable—i.e., it has parameters that can be set in order to affect how the firewall will behave and how it will regulate interaction between the computer and the outside world. There may be a firewall service that is separate from the firewall itself; the firewall service may be designed to receive configuration parameters for the firewall. In some cases it is desirable to be able to configure the firewall remotely; however, remote configuration of the firewall may create a problem.

The firewall is typically configurable only by a privileged user—e.g., one with administrator or network operator privileges. (It is generally desirable that privileged users configure the firewall, since otherwise a user who wanted to circumvent the firewall's protection could simply use the firewall's configuration interface to turn the firewall off, or to unblock network traffic.) However, exposing, through a network, an interface to the firewall service that runs at a highly privileged level is dangerous, because doing so effectively increases the attack surface of the system.

The subject matter disclosed here provides a proxy service that allows the firewall to be configured remotely without directly exposing a privileged interface to remote users of the system. The proxy service operates on the same machine as the firewall that is to be configured. The proxy service determines that the remote user is a privileged user, such as an administrator, but the proxy service itself operates at a lower level of privilege. The proxy service allows a remote user to issue the same configuration instructions that the remote user would otherwise issue to the firewall service itself. The proxy service authenticates the remote user (e.g., by determining that the remote user has valid administrator credentials), and also validates the configuration instructions received from the remote user. If the remote user authenticates and if the instructions are valid, then the proxy service configures the firewall in accordance with the remote user's instructions. When the proxy service configures the firewall, the proxy service impersonates the remote user, so that the configuration can be performed at the remote user's level of privilege.

Since remote configurations of the firewall are performed through the proxy service, it is not necessary for the firewall service itself to engage in network traffic, so it is possible to implement the simple rule of blocking network communication with the firewall service's configuration interface, and the configuration interface can simply be set to receive all instructions locally. (The proxy service is local, since it runs on the same machine as the firewall.) Additionally, since the proxy service's function is to receive configuration instructions from remote sources, it is possible to block outbound traffic from the proxy service, thereby preventing the proxy service from being used for outbound attacks.

ADDITIONAL DETAILED DESCRIPTION

Referring to FIG. 1, there is shown a firewall service 102, which executes on a machine 100. Machine 100 may, for example, be a general purpose computer (such as computer 410, shown in FIG. 4), or may be any other type of device that is capable of running software. Firewall service 102 is a software component that supports firewall 101—for example, by receiving configuration information for firewall 101. The nature of firewall 101 is generally known in the field of computing. Briefly, firewall 101 regulates inbound and outbound network traffic in order to reduce inbound and outbound attacks on the integrity of the machine 100 on which firewall 101 is operating.

Firewall service 102 is "configurable" in the sense that there are a number of configuration parameters 106 that can be set, and whose setting affects the behavior of the underlying firewall 101. For example, configuration parameters 106 may allow an administrator to allow or block network traffic, or may allow the administrator to turn firewall 101 on or off.

Interface 108 is a mechanism through which firewall service 102 can be configured. That is, access to configuration parameters 106, and the ability to set configuration parameters 106, is made through interface 108. Examples of interface 108 include an API that has one or more callable functions used to set configuration parameters 106, or a Remote Procedure Call (RPC) interface. While interface 108 can be used to set configuration parameters 108, it should be understood that interface 108 can take various forms, and the subject matter described herein is not limited to any such form. Interface 108 is said to be "exposed" in the sense that it can be used by components outside of firewall service 102, and, in fact, is one way that outside components can interact with firewall service 102.

It should be noted that firewall service 102 is a convenient example of a configurable software object, although it is only an example. In particular, the subject matter described herein can be used with any configurable software object, whether or not such software object is a firewall or firewall service.

Proxy 104 is a software object that executes on machine 100. Proxy 104 typically insulates firewall 102 from direct network communication, as more particularly described below. Proxy 104 exposes interface 110, which allows components outside of proxy 104 to interact with proxy 104.

One feature of proxy 104's interface 110 is that it can be described as "isomorphic" to interface 108. In one example, isomorphism means that an outside component can interact with interface 108 in the same manner as one could interact with interface 110. For example, if interface 108 exposes a function such as f(int a, void *b), and if interface 110 is isomorphic to interface 108, then interface 110 should also expose the function f(int a, void *b). Interface 110 and interface 108 may each cause different actions to be performed in response to a given function call, but, from the perspective of the caller, the same function calls should be available. One feature of this isomorphism is that a caller that is intending to call interface 108 to set the parameters of firewall service 102 can make the same calls to interface 110 of proxy 104 without having to change the nature of the calls. In fact, the caller may not be aware that the calls are being made to proxy 104 instead of firewall service 102.

Entity 118 is an entity (e.g., an administrator, a bot, etc.) that is capable of communicating with machine 100 remotely through network 112. Communication between machine 100 and network 116 can happen in either direction (as indicated by arrows 112 and 114), although, as discussed below, as regards proxy 104 it may be desirable to limit communication to the direction shown by arrow 112 (which is "inbound", from the perspective of machine 100 or proxy 104).

Entity 118, in the example shown, is an entity that desires to configure firewall 118. In order to configure firewall service 102, entity 118 may issue a configuration instruction 120, which is a type of communication that may flow in the direction of arrow 112. Instruction 120 may take the form of a call to a function exposed by interface 108 or 110. (Instruction 120 may be wrapped in some other data, so that the actual information that is communicated from entity 118 to machine 104 via arrow 112 may include more than merely instruction 120.) Entity 118 knows how to call the interface that is used to configure firewall 102. Since interface 110 is isomorphic to interface 108, as discussed above, entity 118 need not know whether its call will be received by proxy 104 or firewall service 102, since the call would be made in essentially the same manner.

When proxy 104 receives instruction 120 through interface 110, proxy 104 may perform certain tests on instruction 120 (or on the data that comprises instruction 120). For example, proxy 104 may perform an identity evaluation on entity 118 to determine, under some set of one or more criteria, whether entity 118 is entitled to configure a firewall. For example, proxy 104 may require that entity 118 be a privileged user (such as an administrator or network operator), rather than an ordinary user. Additionally, apart from evaluating the identity of the calling entity 118, proxy 104 may perform an evaluation on the validity of the incoming data itself, using one or more criteria such as data size, checksum, consistency, etc. In one example, it may be desirable to perform the identity evaluation of entity 118 prior to performing a validity evaluation on the data.

If entity 118 satisfies the identity evaluation and the incoming data satisfies the validity evaluation, then proxy 104 configures the firewall based on the instructions received from entity 118. In one example, simply makes the same call to interface 108 that proxy 104 received through interface 110, and impersonates entity 118 while making the call. (Firewall service 102 will typically be configurable by a privileged user, and therefore proxy 104 can become such a privileged user for the purpose of the call by impersonating entity 118 after determining that entity 118 is a privileged user.) The call from proxy 104 to firewall service 102 through interface 108 is represented by arrow 122.

If entity 118 does not satisfy the identity evaluation, or if the incoming data does not satisfy the validity evaluation, then proxy 104 determines does not configure firewall service 102 based on the instruction 120 received from entity 118. In this case, the call represented by arrow 122 does not occur.

It should be noted that proxy 104 typically runs at a non privileged level (or at a lower level of privilege than an administrator). For proxy to run at a privileged level while accepting inbound network traffic would effectively increase the attack surface of machine 100 by giving a malicious network user a potential opportunity to act as a privileged user on machine 100. Proxy 104 simply impersonates its caller when making call 122, thereby acquiring the level of privilege of entity 118 for the purpose of configuring firewall service 102.

Additionally, it should be noted that firewall service 102 can be set to accept only local configurations (i.e., configurations based on calls to interface 108 that originate at machine 100 rather than from a remote source); an attempt to configure firewall service 102 from a remote source via network 112 would go through proxy 104, so, from the perspective of firewall service 102, such a configuration would come from a local source. Thus, firewall service 102 can be protected from network-based attacks through its configuration mechanism by simply block all inbound and outbound network traffic to firewall service 102's configuration interface 108.

Moreover, proxy 104 can be protected from being used to wage outbound attacks on machine 100 by blocking outbound network traffic from proxy 104 (i.e., blocking network traffic in the direction of arrow 114). It should be noted that rules such as "block all network traffic to the firewall configuration interface," or "block all outbound traffic from the proxy" are relatively simple rules, which can often be implemented more easily than a substantive filter that allows or blocks particular network traffic based on the substance or origin of the traffic.

Figure 2:
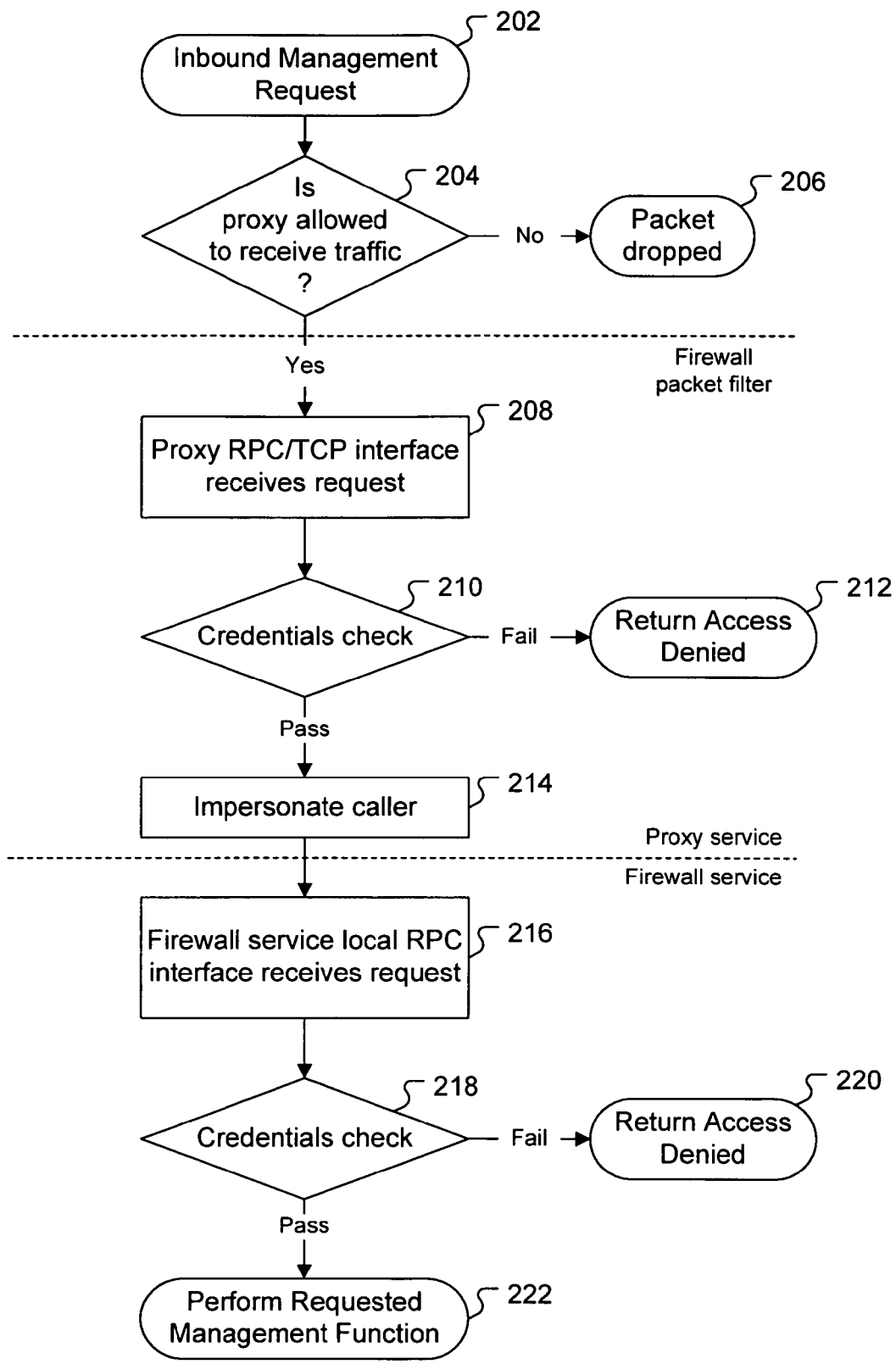
FIG. 2 is a flow diagram of an example process illustrating aspects of the subject matter described herein.

FIG. 2 shows an example process involving components described above. At 202, an inbound management request is received at a proxy (such as proxy 104, show in FIG. 1). If the proxy is not allowed to receive traffic (block 204), then the inbound packet(s) containing the request is (are) dropped (block 206). Otherwise, the proxy's interface (e.g., an RPC/TCP interface) receives the request (block 208). (The term "RPC" is described above; the term "TCP," as is known in the relevant art, stands for "Transport Control Protocol.")

It should be noted that it may be the case that the proxy is not in a state in which it can receive network traffic. The proxy may be in such a state, either because the proxy has not been enabled, or because the proxy has been enabled but has not been allowed to engage in network traffic. It may be desirable for the proxy to be configured such that it must be enabled by the action of a user, and so that the proxy's ability to receive communications from a network is subsequently enabled by a separate action of a user; in this way, allowing the firewall to be configured over the network would involve a user (or users) performing two separate actions to indicate an intent to allow such network configurability.

At 210, the credentials of the entity from which the request originated are checked—e.g., to determine whether the entity has the privilege level of an administrator or network operator. (This action can be viewed as an example of the "identity" evaluation mentioned above.) If the credentials check is not satisfied, then access to the firewall service's configuration interface is denied (block 212). Otherwise, the calling entity is impersonated by the proxy (block 214), and the firewall service's interface (e.g., a local RPC interface) receives the original request (block 216). As noted above, the proxy may make the request by issuing the same call to the firewall service's interface that the proxy received at its own interface. The firewall service performs its own check on the credentials of the caller (block 218). The caller, from the perspective of the firewall service, is the proxy; since the proxy is impersonating the original entity that made the call to the proxy (see block 214), the proxy would normally be able to satisfy the credentials check. If the credentials check is not satisfied, then access to the firewall service's configuration interface is denied (block 220). On the other hand, if the credentials check is satisfied, then the firewall service performs the requested management function (block 222).

Figure 3:
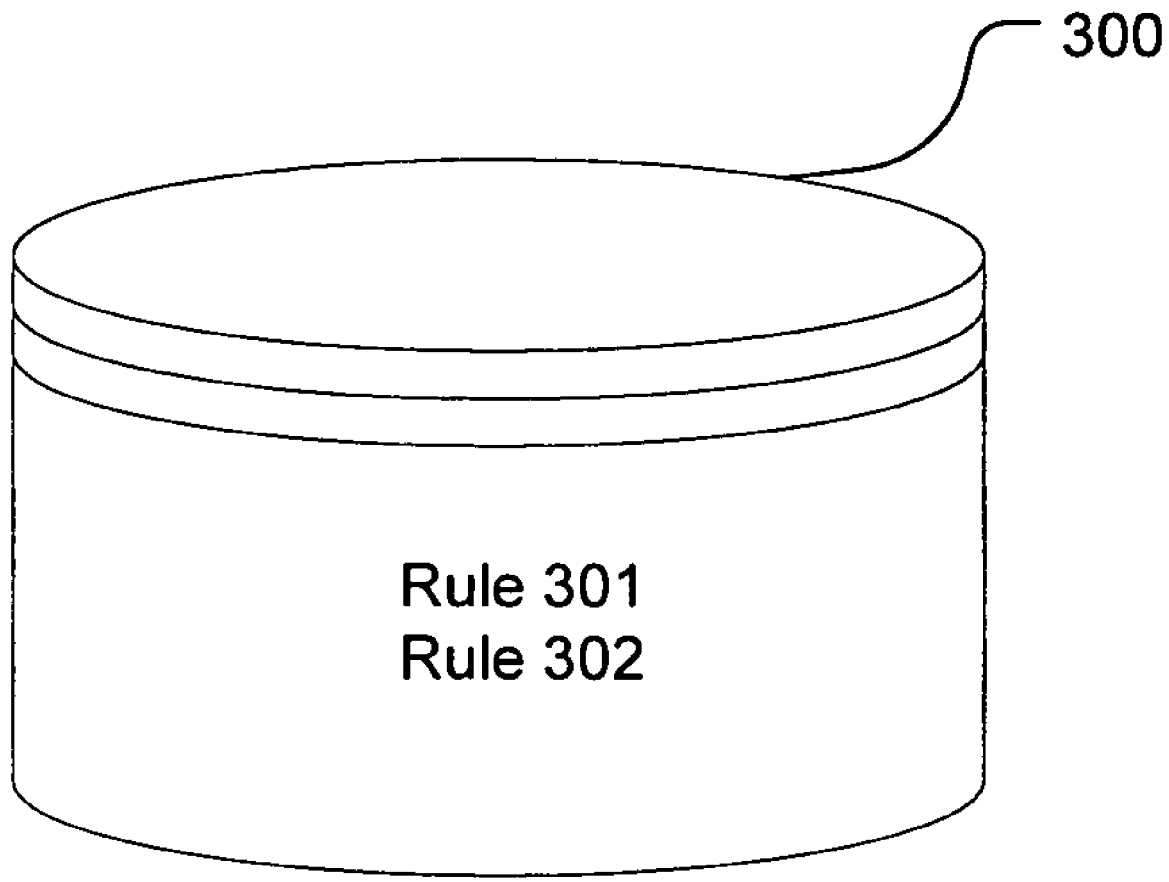
FIG. 3 is a block diagram of stored rules.

FIG. 3 illustrates the notion of stored rules, which can govern the behavior of software object. Rule store 300 stores one or more rules—in this example, two rules 301 and 302 are shown. These rules may govern the type of network communications that a software object may engage in. For example, a rule can specify that all network communication with the firewall service is to be blocked; or that the proxy can accept inbound, but not outbound, communication; or that the proxy can accept only inbound RPC communication, and should block all other network traffic.

Example rules that can govern the proxy are:

Action=Allow;Dir=IN;Svc=SecureProxy;LPort=RPC;
        Name=Allow Remote RPC Traffic Action=Block;Dir=IN;Svc=SecureProxy;
        Name=Block all other traffic;

The foregoing rules collectively allow remote RPC inbound traffic and block all other inbound traffic from the secure proxy.

An example rule that can govern the firewall service is:

Action=Block;DirIN;Svc=Firewall;Name=B lock all traffic;

The foregoing rule blocks the firewall service from receiving any network traffic.

Example Computing Environment

Figure 4:
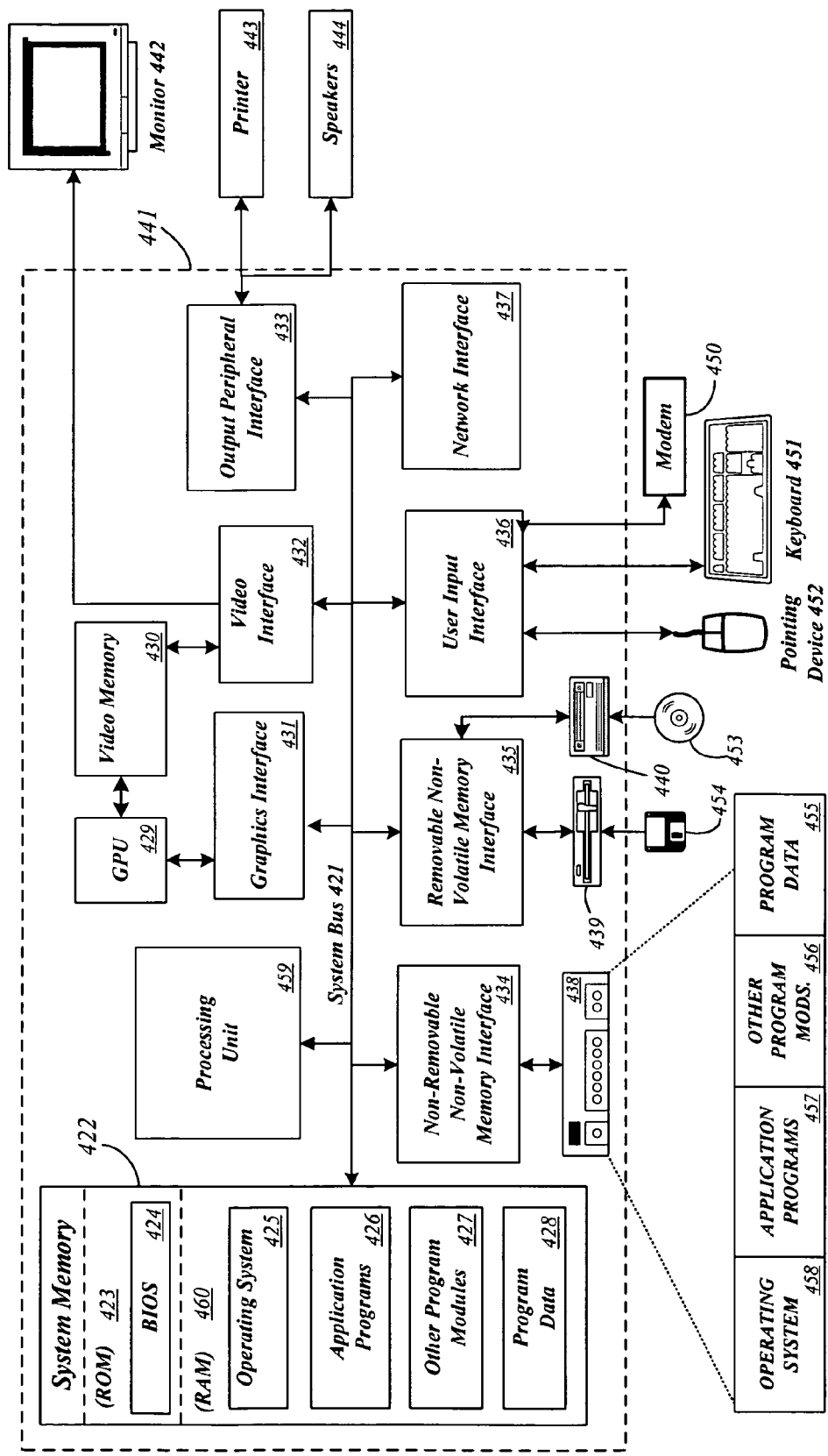
FIG. 4 is a block diagram of an example computing environment in which aspects of the herein-described subject matter may be deployed.

Referring to FIG. 4, shown is a block diagram representing an example computing device. The computing system environment 420 is only one example of a suitable computing environment and is not intended to suggest any limitation as to the scope of use or functionality of the subject matter disclosed herein. Neither should the computing environment 420 be interpreted as having any dependency or requirement relating to any one or combination of components illustrated in the example operating environment 420.

Aspects of the subject matter described herein are operational with numerous other general purpose or special purpose computing system environments or configurations. Examples of well known computing systems, environments, and/or configurations that may be suitable for use with the subject matter described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

An example system for implementing aspects of the subject matter described herein includes a general purpose computing device in the form of a computer 441. Components of computer 441 may include, but are not limited to, a processing unit 459, a system memory 422, and a system bus 421 that couples various system components including the system memory to the processing unit 459. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 441 typically includes a variety of computer readable media. Computer readable media can be any available media that can be accessed by computer 441 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 441. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer 441, such as during startup, is typically stored in ROM 423. RAM 460 typically contains data and/or program modules that are immediately accessible to and/or presently being operated on by processing unit 459. By way of example, and not limitation, FIG. 4 illustrates operating system 425, application programs 426, other program modules 427, and program data 428.

The computer 441 may also include other removable/non-removable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 438 is typically connected to the system bus 421 through a non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). A monitor 442 or other type of display device is also connected to the system bus 421 via an interface, such as a video interface 432. In addition to the monitor, computers may also include other peripheral output devices such as speakers 444 and printer 443, which may be connected through an output peripheral interface 433.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for enabling a first software object to be configured remotely by an entity, the first software object exposing a first interface through which the first software object is configurable, the first interface exposing a plurality of first functions, each of the first functions having an associated first prototype, the system comprising:

a second software object that (i) executes on a machine on which said first software object executes, that (ii) receives one or more instructions and one or more data from said entity through a network, that (iii) performs one or more authentications on said entity and said data, and that (iv) configures said first software object in accordance with said one or more instructions if said entity and said data satisfies said one or more authentications, wherein said second software object exposes a second interface, the second interface exposing a plurality of second functions, each of the second functions having an associated second prototype, wherein each second function exposed by the second interface is associated with a counterpart first function exposed by the first interface having an identical prototype; and one or more stored rules that specify that said second software object is not to engage in outbound communication over said network, and that further specify that said first software object is not to engage in communication over said network, wherein said one or more stored rules govern behavior of said first software object and of said second software object.

2. The system of claim 1, wherein said second software object receives said one or more instructions by way of said second interface and configures said first software object through said first interface.

3. The system of claim 1, wherein said one or more instructions are received by said second software object in the form of a collection of data that comprises said one or more instructions, wherein said second software object determines, as a condition to said second software object's configuring said first software object, that said collection of data satisfies at least one validity criterion.

4. The system of claim 1, wherein said second software object impersonates an identity of the entity while configuring said first software object, and wherein said first software object validates an identity of said second software object as a condition to allowing said second software object to configure said first software object.

5. The system of claim 1, wherein said entity is capable of having either a high-privileged status or a low- or non-privileged status, and wherein at least one of said one or more authentications is satisfied only if said entity has said high-privileged status.

6. The system of claim 1, wherein said second software object is configured to require a user to perform a first action in order for said second software object to be operational, and wherein said second software object is further configured to require a user to perform a second action in order for said second software object to receive communication via a network.

7. The system of claim 1, wherein said first software object is configurable only via an interface that is accessible only from said machine on which said first software object is running.

8. A method comprising:
executing, by a computing system, a method for configuring a first software object based on instructions received remotely from an entity, the first software object exposing a first interface through which the first software object is configurable, the first interface exposing a plurality of first functions, each of the first functions having an associated first prototype, wherein the method executed by the computing system for configuring the first software object comprises:
receiving, from the entity through a network, data comprising one or more instructions to configure the first software object;
acting in accordance with a first rule that specifies that a second software object is not to engage in any outbound communication over said network;
determining that the entity satisfies at least one identity criterion;
determining that the data satisfy at least one validity criterion;
impersonating the entity by causing the second software object to interact with the first software object and further causing the second software object to interact with the entity by exposing a second interface via the second software object, the second interface exposing a plurality of second functions, each of the second functions having an associated second prototype, wherein each second function exposed by the second interface is associated with a counterpart first function exposed by the first interface having an identical prototype; and
configuring said first software object in accordance with said one or more instructions.

9. The method of claim 8, wherein said data comprising one or more instructions are received by way of said second interface, and wherein said configuring is performed by the second software object interacting with the first software object through the first interface.

10. The method of claim 8, wherein said first software object acts in accordance with a second rule that specifies that said first software object is not to engaging in any communication over said network.

11. The method of claim 8, wherein said entity is capable of having either a high-privileged status or a low- or non-privileged status, and wherein said determining that the entity satisfies at least one identity criterion comprises determining that said entity has said high-privileged status.

12. The method of claim 8, further comprising:
receiving a first direction to enable operation of said second software object; and
receiving a second direction user to enable said second software object to accept communication from said network, said second software object rejecting communication from said network unless said second direct has been received, said first direction and said second direct being initiated by one or more users.

13. The method of claim 8, wherein said first software object and said second software object both run on one machine, and wherein said first software object is configurable only via an interface that is accessible only from said machine.

14. The method of claim 8, wherein said determining that the entity satisfies at least one identity criterion is performed before said determining that the data satisfy at least one validity criterion.

15. One or more computer-readable tangible storage media having stored thereon:
first executable instructions that implement a first software object, said first software object exposing a first interface that enables configuration parameters of said first software object to be set, wherein the first software object exposes a first interface through which the first software object is configurable, the first interface exposing a plurality of first functions, each of the first functions having an associated first prototype;
second executable instructions that implement a second software object, said second software object exposing a second interface that is isomorphic to said first interface such that the second interface exposes a plurality of second functions, each of the second functions having an associated second prototype, wherein each second function exposed by the second interface is associated with a counterpart first function exposed by the first interface having an identical prototype, said second software object receiving one or more configuration instructions from an entity through a network and using said first interface to set said configuration parameters of said first software object based on said one or more configuration instructions, said second executable instructions behaving in accordance with at least one rule governing communication over said network.

16. The one or more computer-readable tangible storage media of claim 15, wherein said at least one rule comprises a rule that said second software object is not permitted to engage in outbound communication over said network.

17. The one or more computer-readable tangible storage media of claim 15, wherein said second software object is configured not to operate until a first action with respect to said second software object has been performed, and wherein said at least one rule comprises a rule that said second software object is not permitted to accept communication from said network until a first action with respect to said second software object has been performed.

18. The one or more computer-readable tangible storage media of claim 15, wherein said second software object performs at least one identity test on said entity and that further performs at least one validity test on data that comprises said configuration instructions prior to setting said configuration parameters of said first software object.

19. The one or more computer-readable tangible storage media of claim 15, wherein said entity is capable of having a privileged status or a non-privileged status, wherein said second software object determines that said entity has said privileged status prior to setting said configuration parameters of said first software object, and wherein said second software object impersonates said entity when setting said configuration parameters.

20. The one or more computer-readable tangible storage media of claim 15, wherein said first software object allows said configuration parameters to be set through said first interface only when said first interface is accessed from a machine on which said first software object is running.

* * * * *